(12) United States Patent
Zhuge et al.

(10) Patent No.: US 11,843,841 B2
(45) Date of Patent: Dec. 12, 2023

(54) INFORMATION INTERACTION METHOD AND APPARATUS, AND STORAGE MEDIUM

(71) Applicant: Beijing Bytedance Network Technology Co., Ltd., Beijing (CN)

(72) Inventors: Jingjing Zhuge, Beijing (CN); Xiafei Fan, Beijing (CN); Qi Jiang, Beijing (CN); Shaohui Lyu, Beijing (CN); Yuanlong Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/817,929

(22) Filed: Aug. 5, 2022

(65) Prior Publication Data

US 2022/0377436 A1    Nov. 24, 2022

Related U.S. Application Data

(63) Continuation of application No. PCT/CN2021/111570, filed on Aug. 9, 2021.

(30) Foreign Application Priority Data

Aug. 28, 2020   (CN) .......................... 202010888531.4

(51) Int. Cl.
*H04N 21/8545* (2011.01)
*H04N 21/454* (2011.01)
*H04N 21/8358* (2011.01)

(52) U.S. Cl.
CPC ....... *H04N 21/8545* (2013.01); *H04N 21/454* (2013.01); *H04N 21/8358* (2013.01)

(58) Field of Classification Search
CPC ............. H04N 21/8545; H04N 21/454; H04N 21/8358
See application file for complete search history.

(56) References Cited

U.S. PATENT DOCUMENTS

| 2002/0054088 | A1 | 5/2002 | Tanskanen et al. |
| 2009/0177793 | A1* | 7/2009 | Josa ........................ G06F 21/10 |
| | | | 380/42 |

(Continued)

FOREIGN PATENT DOCUMENTS

| CN | 101281632 A | 10/2008 |
| CN | 104270727 A | 1/2015 |

(Continued)

OTHER PUBLICATIONS

International Search Report for International Patent Application No. PCT/CN2021/111570, dated Sep. 29, 2021 (18 pages).

(Continued)

*Primary Examiner* — Sumaiya A Chowdhury
(74) *Attorney, Agent, or Firm* — ARENTFOX SCHIFF LLP

(57) ABSTRACT

The present application provides an information interaction method and apparatus, and a storage medium. In the method, a server receives an interactive video uploaded by a first user terminal, and sends the interactive video to a second user terminal. That is, in the embodiments of the present application, the video is taken as a carrier of interaction between strangers, which can bear diversified user information expressions. Moreover, the server further receives processing information for the interactive video sent by the second user terminal and/or the first user terminal, and processes the interactive video according to the processing information. That is, based on the video, friendly video interaction between strangers is realized, and social experiences of strangers in social activities are improved.

20 Claims, 9 Drawing Sheets

(56) References Cited

U.S. PATENT DOCUMENTS

| | | | | |
|---|---|---|---|---|
| 2011/0099083 | A1* | 4/2011 | Karpinsky | H04N 21/2743 |
| | | | | 705/26.25 |
| 2014/0020115 | A1* | 1/2014 | Le Chevalier | G06F 16/2228 |
| | | | | 726/28 |
| 2014/0359786 | A1* | 12/2014 | Lee | G06F 21/10 |
| | | | | 726/27 |
| 2017/0214973 | A1 | 7/2017 | Slaughter et al. | |
| 2020/0197817 | A1 | 6/2020 | Chan et al. | |

FOREIGN PATENT DOCUMENTS

| | | | |
|---|---|---|---|
| CN | 107835122 | A | 3/2018 |
| CN | 108521587 | A | 9/2018 |
| CN | 108668151 | A | 10/2018 |
| CN | 108809799 | A | 11/2018 |
| CN | 109257657 | A | 1/2019 |
| CN | 109450894 | A | 3/2019 |
| CN | 109660873 | A | 4/2019 |
| CN | 109889864 | A | 6/2019 |
| CN | 110048928 | A | 7/2019 |
| CN | 110933456 | A | 3/2020 |
| CN | 111970576 | A | 11/2020 |

OTHER PUBLICATIONS

Notification to Grant Patent Right for Invention for Chinese Patent Application No. 202010888531.4, dated Dec. 17, 2021 (6 pages).
First Office Action for Chinese Patent Application No. 202010888531.4, dated Jul. 2, 2021 (22 pages).
Second Office Action for Chinese Patent Application No. 202010888531.4, dated Sep. 18, 2021 (23 pages).

* cited by examiner

INFORMATION INTERACTION METHOD AND APPARATUS, AND STORAGE MEDIUM

CROSS-REFERENCE TO RELATED APPLICATIONS

The present application is a continuation of International Application No. PCT/CN2021/111570, filed on Aug. 9, 2021, which claims priority to Chinese patent application No. 202010888531.4, filed on Aug. 28, 2020, both of which are hereby incorporated by reference in their entireties.

TECHNICAL FIELD

The present application relates to communication technologies, and in particular, to an information interaction method and apparatus, and a storage medium.

BACKGROUND

With the development of science and technology, terminals such as mobile phones have gradually become an essential part of people's lives, and people like to communicate with others through terminals such as mobile phones more and more. At present, there are many social tools on terminals such as mobile phones, which meet various needs of users on the one hand, and bring some new problems to the users on the other hand.

In the related art, when the users use social tools on terminals such as mobile phones to communicate with others, they usually need to be in a state of being a friend with the others, otherwise, the users cannot communicate with each other.

However, there is no effective solution to the above problems. Therefore, how to establish contacts between strangers, realize communication between strangers and improve users' social experiences has become a problem that needs to be solved urgently.

SUMMARY

To solve the problems existing in the prior art, the present application provides an information interaction method and apparatus, and a storage medium.

In a first aspect, an embodiment of the present application provides an information interaction method, including:
receiving an interactive video uploaded by a first user terminal;
sending the interactive video to a second user terminal, where the second user terminal is different from the first user terminal;
receiving processing information for the interactive video sent by the second user terminal and/or the first user terminal; and
processing the interactive video according to the processing information.

In a possible implementation, before sending the interactive video to the second user terminal, the method further includes:
determining video features of the interactive video; and
determining, according to the video features, the second user terminal receiving the interactive video.

In a possible implementation, before determining the video features of the interactive video, the method further includes:
performing compliance detection on the interactive video;
where the determining the video features of the interactive video includes:
if the interactive video passes the compliance detection, determining the video features according to video content of the interactive video.

In a possible implementation, the determining the video features of the interactive video includes:
inputting the interactive video into a preset feature extraction model, where the preset feature extraction model is obtained through training of reference videos and video features of the reference videos;
determining the video features of the interactive video according to an output of the preset feature extraction model.

In a possible implementation, before sending the interactive video to the second user terminal, the method further includes:
determining a rendering watermark and a video special effect corresponding to the interactive video according to video content of the interactive video; and
performing watermark rendering on the interactive video according to the rendering watermark, and performing video special effect processing on the interactive video according to the video special effect.

In a possible implementation, the processing information for the interactive video sent by the second user terminal includes confirmation information for confirming acquisition of the interactive video;
where the processing the interactive video according to the processing information includes:
locking the interactive video according to the confirmation information, so as to prevent the interactive video from being acquired by a user terminal other than the second user terminal.

In a possible implementation, the interactive video further carries a contact establishment prompt, and the processing information for the interactive video sent by the second user terminal further includes discarding information for discarding the interactive video after the interactive video is acquired, and the processing information for the interactive video sent by the first user terminal includes rejection information for rejecting to establish contact with the second user terminal;
where the processing the interactive video according to the processing information includes:
unlocking the interactive video according to the discarding information or the rejection information.

In a possible implementation, after unlocking the interactive video, the method further includes:
acquiring an identifier of the second user terminal, and determining, according to the identifier, a third user terminal receiving the interactive video; and
taking the third user terminal as a new second user terminal, and re-performing the step of sending the interactive video to the second user terminal.

In a possible implementation, the interactive video further carries a contact establishment prompt, and the processing information for the interactive video sent by the first user terminal includes consent information for consenting to establish contact with the second user terminal;
where the processing the interactive video according to the processing information further includes:
deleting the interactive video according to the consent information.

In a second aspect, an embodiment of the present application provides another information interaction method, which is executed by the first user terminal and includes:

uploading an interactive video to a server, where the interactive video is used for instructing the server to send the interactive video to a second user terminal, and the second user terminal is different from the first user terminal;

sending processing information for the interactive video to the server, where the processing information is used for instructing the server to process the interactive video according to the processing information.

In a possible implementation, the interactive video further carries a contact establishment prompt, and the processing information includes consent information for consenting to establish contact with the second user terminal, and the consent information is used for instructing the server to delete the interactive video.

In a third aspect, an embodiment of the present application provides another information interaction method, which is executed by the second user terminal and includes:

receiving an interactive video sent by a server, where the interactive video is uploaded to the server by a first user terminal, and the second user terminal is different from the first user terminal;

sending processing information for the interactive video to the server, where the processing information is used for instructing the server to process the interactive video according to the processing information.

In a possible implementation, the processing information includes confirmation information for confirming acquisition of the interactive video, and the confirmation information is used for instructing the server to lock the interactive video to prevent the interactive video from being acquired by a user terminal other than the second user terminal.

In a possible implementation, the interactive video further carries a contact establishment prompt, and the processing information further includes discarding information for discarding the interactive video after the interactive video is acquired, and the discarding information is used for instructing the server to unlock the interactive video.

In a fourth aspect, an embodiment of the present application provides an information interaction apparatus, including:

a first receiving module, configured to receive an interactive video uploaded by a first user terminal;

a first sending module, configured to send the interactive video to a second user terminal, where the second user terminal is different from the first user terminal;

a second receiving module, configured to receive processing information for the interactive video sent by the second user terminal and/or the first user terminal;

a processing module, configured to process the interactive video according to the processing information.

In a fifth aspect, an embodiment of the present application provides another information interaction apparatus, which is arranged at a first user terminal and includes:

a uploading module, configured to upload an interactive video to a server, where the interactive video is used for instructing the server to send the interactive video to a second user terminal, and the second user terminal is different from the first user terminal;

a second sending module, configured to send processing information for the interactive video to the server, where the processing information is used for instructing the server to process the interactive video according to the processing information.

In a sixth aspect, an embodiment of the present application provides another information interaction apparatus, which is arranged at a second user terminal and includes:

a third receiving module, configured to receive an interactive video sent by a server, where the interactive video is uploaded to the server by a first user terminal, and the second user terminal is different from the first user terminal;

a third sending module, configured to send processing information for the interactive video to the server, where the processing information is used for instructing the server to process the interactive video according to the processing information.

In a seventh aspect, an embodiment of the present application provides an information interaction system, including:

a first user terminal, configured to upload an interactive video to a server and send processing information for the interactive video to the server;

the server, configured to receive the interactive video, send the interactive video to a second user terminal, receive the processing information for the interactive video sent by the second user terminal and/or processing information for the interactive video sent by the first user terminal, and process the interactive video according to the processing information, where the second user terminal is different from the first user terminal;

the second user terminal, configured to receive the interactive video and send the processing information for the interactive video to the server.

In an eighth aspect, an embodiment of the present application provides a server, including:

a processor;
a memory; and
a computer program;

where the computer program is stored in the memory and configured to be executed by the processor, the computer program includes instructions for executing the method as described in the first aspect.

In a ninth aspect, an embodiment of the present application provides a user terminal, including:

a processor;
a memory; and
a computer program;

where the computer program is stored in the memory and configured to be executed by the processor, and the computer program includes instructions for executing the method as described in the second aspect.

In a tenth aspect, an embodiment of the present application provides another user terminal, which includes:

a processor;
a memory; and
a computer program;

where the computer program is stored in the memory and configured to be executed by the processor, and the computer program includes instructions for executing the method as described in the third aspect.

In an eleventh aspect, an embodiment of the present application provides a computer-readable storage medium which stores a computer program that causes a processor to execute the method as described in the first aspect.

In a twelfth aspect, an embodiment of the present application provides a computer-readable storage medium which stores a computer program that causes a processor to execute the method as described in the second aspect.

In a thirteenth aspect, an embodiment of the present application provides a computer-readable storage medium which stores a computer program that causes a processor to execute the method as described in the third aspect.

In a fourteenth aspect, an embodiment of the present application provides a computer program product, including a computer program, when the computer program is executed by a processor, the method as described in the first aspect is implemented.

In a fifteenth aspect, an embodiment of the present application provides a computer program product, including a computer program, when the computer program is executed by a processor, the method as described in the second aspect is implemented.

In a sixteenth aspect, an embodiment of the present application provides a computer program product, including a computer program, when the computer program is executed by a processor, the method as described in the third aspect is implemented.

In a seventeenth aspect, an embodiment of the present application provides a computer program, when the computer program is executed by a processor, the method as described in the first aspect is implemented.

In an eighteenth aspect, an embodiment of the present application provides a computer program, when the computer program is executed by a processor, the method as described in the second aspect is implemented.

In a nineteenth aspect, an embodiment of the present application provides a computer program, when the computer program is executed by a processor, the method as described in the third aspect is implemented.

According to the information interaction method and apparatus, and storage medium provided by embodiments of the present application, in the method, a server receives an interactive video uploaded by a first user terminal, and sends the interactive video to a second user terminal. That is, in the embodiments of the present application, the video is taken as a carrier of interaction between strangers, which can bear diversified user information expressions. Moreover, the server further receives processing information for the interactive video sent by the second user terminal and/or the first user terminal, and processes the interactive video according to the processing information. That is, based on the video, friendly video interaction between strangers is realized, and social experiences of strangers in social activities are improved.

BRIEF DESCRIPTION OF DRAWINGS

In order to more clearly explain the embodiments of the present application or the technical solutions in the prior art, in the following, the drawings that need to be used in the description of the embodiments or the prior art will be introduced briefly. Obviously, the drawings in the following description are only some embodiments of the present application. For those of ordinary skill in this field, other drawings can be obtained according to these drawings without any creative labor.

DESCRIPTION OF EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiments in the present application, all other embodiments obtained by those of ordinary skill in this field without creative labor belong to the scope of protection of the present application.

Terms such as "first", "second", "third" and "fourth" etc. (if any) in the specification and claims and the above drawings of the present application, are used to distinguish similar objects, and are not necessarily used to describe a specific order or sequence. It should be understood that the data used in this way can be interchanged under appropriate circumstances, so that the embodiments of the present application described herein can be implemented in a sequence other than those illustrated or described herein. In addition, the terms "include" and "have" and any variations thereof are intended to cover non-exclusive inclusion. For example, a process, method, system, product or device that includes a series of steps or units is not necessarily limited to those steps or units that are clearly listed, but may include other steps or units that are not clearly listed or inherent to the process, method, product or device.

The information interaction related to the embodiments of the present application refers to that a video is used as a carrier of interaction between strangers, (for example, one implementation is a drift bottle, that is, the above video (e.g., short video) can be regarded as a drift bottle), so that video interaction between strangers can be realized based on the above video, and the social experiences of strangers in social activities can be improved. The interactive video in the present application can include short videos uploaded by users, in which diversified information expressions of the users are carried, so that the association between strangers can be efficiently established.

The information interaction method provided by the embodiments of the present application can be applied to information interaction scenarios between strangers, and can also be applied to information sharing, social interaction and other scenarios between strangers, which are not particularly limited by the embodiments of the present application.

Figure 1:
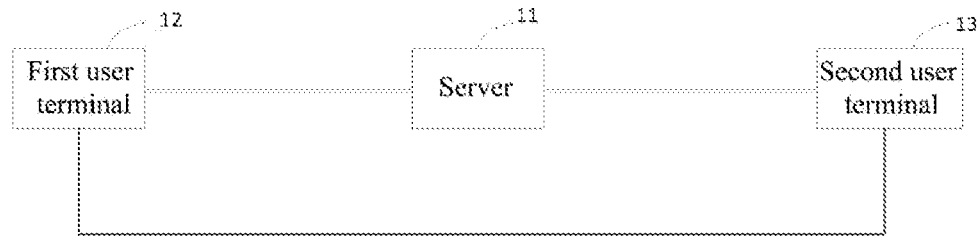
FIG. 1 is a schematic diagram of architecture of an information interaction system provided by an embodiment of the present application.

In an embodiment, the information interaction method provided by the embodiments of the present application can be applied to an application scenario shown in FIG. 1. FIG. 1 only describes a possible application scenario of the information interaction method provided by the embodiments of the present application by way of example, and the application scenario of the information interaction method provided by the embodiments of the present application is not limited to the application scenario shown in FIG. 1.

FIG. 1 is a schematic diagram of architecture of an information interaction system. In FIG. 1, information interaction between a first user (User 1) and a second user (User 2) is taken as an example, where User 1 and User 2 are strangers, User 1 uses a first user terminal, and User 2 uses a second user terminal. Here, the first user terminal and the second user terminal can install applications (APP) that realize functions of video acquisition, uploading and the like, and User 1 and User 2 can interact with a server through the APPs on the terminals. The above architecture may include a server 11, a first user terminal 12, and a second user terminal 13.

It can be understood that the schematic structure of the embodiments of the present application does not constitute a specific limitation on the information interaction architecture. In other feasible embodiments of the present application, the above architecture may include more or less components than those shown, or some components may be combined, or some components may be split, or different components may be arranged, which may be determined according to actual application scenarios, and is not limited here. The components shown in FIG. 1 can be implemented in hardware, software, or a combination of software and hardware.

In a specific implementation process, in the embodiments of the present application, User 1 uploads an interactive video to the server 11 through the first user terminal 12, where User 1 can upload the interactive video to the server 11 through an APP in the first user terminal 12, and the APP can realize the functions of video acquisition, uploading, etc. Here, the interactive video can be understood as content created by User 1 for interacting with other users by means of videos, and a type and quantity of the specific interactive video can be determined according to actual situations, for example, the interactive video can be a short video. After receiving the interactive video, the server 11 can set a state of the interactive video, for example, set its state to a first state, for example, an initial state, and trigger a corresponding processing flow, for example, determine a user terminal receiving the interactive video. If determining that the corresponding user terminal receiving the interactive video is the second user terminal 13, the server 11 can send the interactive video to the second user terminal 13. At this time, the server 11 can mark the state of the interactive video as a second state, such as Ready state, indicating that it can be acquired by a user terminal. User 2 acquires the interactive video through the second user terminal 13, and the information interaction between User 1 and User 2 is thus realized. Exemplarily, User 2 acquires the interactive video sent by the server 11 through an APP in the second user terminal 13, where the APP can realize the functions of video acquisition, uploading, etc. Here, by taking the video as an interactive carrier (such as a drift bottle, that is, the above video can be regarded as a drift bottle), the interactive video can carry more diversified user information expressions as compared with texts. Moreover, based on the interactive video, friendly video interaction between strangers is realized, and social experiences of users using in social activities are improved.

In addition, the interactive video may further carry a contact establishment prompt. After acquiring the interactive video through the second user terminal 13, if User 2 wants to establish contact with User 1, User 2 can send a contact establishment request to the first user terminal 12 through the second user terminal 13, for example, send the contact establishment request to the first user terminal 12 through the above APP in the second user terminal 13. User 1 receives the friend request through the first user terminal 12. For example, User 1 receives the friend request through the above APP in the first user terminal 12. If User 1 consents to establish contact, User 2 successfully establishes contact with User 1, thus realizing friendship between strangers.

In this embodiment, the first user terminal and the second user terminal can be handheld devices, vehicle-mounted devices, wearable devices, computing devices, and various types of User Equipment (UE), etc., which are equipped with APPs for realizing functions of video acquisition, uploading, etc.

In addition, the system architecture and service scenarios described in the embodiments of the present application are intended to explain the technical solutions of the embodiments of the present application more clearly, and do not constitute a limitation on the technical solutions provided by the embodiments of the present application. As those of ordinary skill in this field knows, with the evolution of network architecture and the emergence of new service scenarios, the technical solutions provided by the embodiments of the present application are also applicable to similar technical problems.

The following embodiments are taken as examples to describe the technical solutions of the present application, and the same or similar concepts or processes may not be described in detail in some embodiments.

Figure 2:
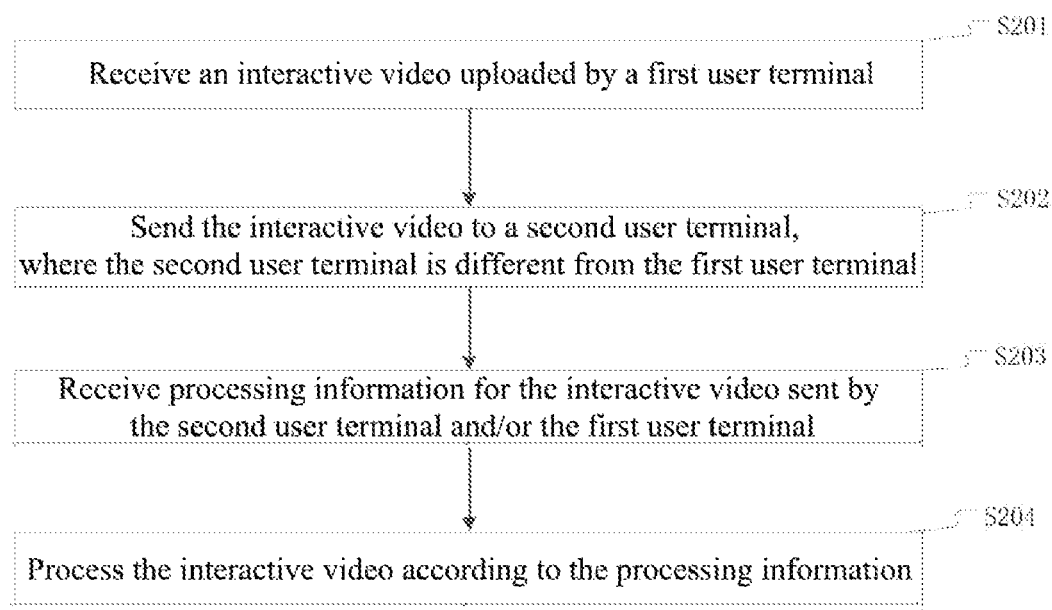
FIG. 2 is a schematic flowchart of an information interaction method provided by an embodiment of the present application.

FIG. 2 is a schematic flowchart of an information interaction method provided by an embodiment of the present application, in which the executive subject can be the server 11 in FIG. 1, and the specific executive subject can be determined according to the actual application scenarios, which is not particularly limited by the embodiments of the present application. As shown in FIG. 2, the information interaction method provided by the embodiment of the present application may include following steps.

S201: receive an interactive video uploaded by a first user terminal.

Here, after receiving the interactive video uploaded by the first user terminal, the server can set a state of the interactive video, for example, set its state to a first state, such as an initial state, and trigger a corresponding processing flow, such as determining a second user terminal receiving the interactive video.

Exemplarily, the method further includes:
determining video features of the interactive video; and
determining, according to the video features, a second user terminal receiving the interactive video.

In some feasible embodiments, the server can acquire user historical browsing information recorded, and then determine features of videos browsed by a plurality of user terminals according to the user historical browsing information, and determine the second user terminal receiving the interactive video according to the video features and the features of the videos browsed by the plurality of user terminals. The user historical browsing information may include videos browsed by the plurality of user terminals in a preset time period.

Here, the preset time period can be determined according to actual situations, for example, in the last week, which is not particularly limited by the embodiments of the present application. The user historical browsing information may also include audio or image information browsed by the plurality of user terminals in the preset time period, and further, the features of the videos browsed by the plurality of user terminals are determined according to the user historical browsing information.

Video information in the user historical browsing information may include video features (such as sound features and image features). The audio information in the user historical browsing information may include sound features. The image information in the user historical browsing information may include image features.

Where the server determines the second user terminal receiving the interactive video according to the video features and the features of the videos browsed by the plurality of user terminals may include:

the server matching the video features with the features of the videos browsed by the plurality of user terminals, and determining the second user terminal receiving the interactive video according to a matching result. For example, the second user terminal may be a determined user terminal corresponding to features of a video having the highest matching degree with the video features.

In addition to the above, in some feasible embodiments, the server can receive interest features input by users of the plurality of user terminals, and then, the server determines the second user terminal receiving the interactive video according to the input interest features and the video features.

The interest features may include sound features and/or image features, etc. The server matches the video features with the input interest features, and determines the second user terminal receiving the interactive video according to a matching result. For example, the second user terminal may be a determined user terminal corresponding to an interest feature having the highest matching degree with the video features.

In addition, in some feasible embodiments, the server may also randomly determine the second user terminal receiving the interactive video.

In an embodiment, after receiving the interactive video, the server may further:

perform compliance detection on the interactive video, where the compliance detection can be understood as detecting whether the interactive video meets a preset requirement, and the preset requirement can be determined according to actual situations, such as whether content of some videos meet the requirement, etc., which is not particularly limited by the embodiments of the present application.

If the interactive video passes the compliance detection, the server can determine the video features of the interactive video according to video content of the interactive video.

In an embodiment of the present application, the determining the video features of the interactive video may include:

inputting the interactive video into a preset feature extraction model, where the preset feature extraction model is obtained through training of reference videos and video features of the reference videos; and determining the video features of the interactive video according to an output of the preset feature extraction model.

A video is input into the preset feature extraction model, and the preset feature extraction model outputs video features of the video. For example, in the training stage, reference videos are input into the preset feature extraction model and the preset feature extraction model outputs the video features of the reference videos. After the training of the preset feature extraction model is completed, the server can input the interactive video into the preset feature extraction model, and determine the video features of the interactive video according to the output of the preset feature extraction model.

Here, the video features of the interactive video may include sound features and image features (for example, key frames are extracted to determine the sound features and image features of the interactive video).

In addition, the interactive video can also carry other information, such as text information, which can be specifically determined according to actual situations, and is not particularly limited by the embodiments of the present application.

S202: send the interactive video to a second user terminal, where the second user terminal is different from the first user terminal.

In some feasible embodiments, before sending the interactive video to the second user terminal, the method further includes:

determining a rendering watermark and a video special effect corresponding to the interactive video according to video content of the interactive video; and performing watermark rendering on the interactive video according to the rendering watermark, and performing video special effect processing on the interactive video according to the video special effect.

Here, the server can preset a processing model which is obtained through training of rendering watermarks and video special effects and the video content of the reference videos, and then, the server can input the interactive video into the processing model, and determine the rendering watermark and video special effect corresponding to the interactive video according to the output of the processing model, so as to perform watermark rendering and video special effect processing on the interactive video.

After receiving the interactive video uploaded by the first user terminal, the server can generate a unique interactive video identifier (id) to record this reception, so as to carry out subsequent processing based on the identifier, for example, perform watermark rendering and video special effect processing on the interactive video, and bind the processed interactive video with the interactive video identifier (id), to ensure the subsequent processing to be carried out correctly, which is suitable for applications.

In addition, the interactive video can also carry a validity period, that is, the duration for which the interactive video is valid. The server can send the interactive video within the validity period to the second user terminal, and discard the interactive video beyond the validity period to ensure that the latest video is provided to the user. The validity period can be determined according to actual situations, for example, one day, which is not particularly limited by the embodiments of the present application.

After receiving the interactive video uploaded by the first user terminal, the server first judges whether the interactive video is within the validity period when performing subsequent operations, and if so, the server executes subsequent steps, otherwise the server stops the corresponding operations. For example, before sending the interactive video to the second user terminal, the server first judges whether the interactive video is within the validity period, and if so, the server executes subsequent steps, otherwise the server stops the corresponding operations. Further, the server can delete the invalid interactive video to save storage space, so that more effective interactive videos can be obtained for subsequent processing, which is suitable for applications.

Here, the interactive video carries the validity period to ensure that the interactive video is an interactive video uploaded by the user terminal recently, thus realizing the video interaction between strangers based on the interactive video in time, which is suitable for applications.

S203: receive processing information for the interactive video sent by the second user terminal and/or the first user terminal.

The processing information for the interactive video sent by the second user terminal may include confirmation information for confirming acquisition of the interactive video, or discarding information for discarding the interactive video after the interactive video is acquired, etc., which can be specifically determined according to actual situations, and is not particularly limited by the embodiments of the present application. The processing information for the interactive video sent by the first user terminal includes rejection information for rejecting to establish contact with the second user terminal, or consent information for consenting to establish contact with the second user terminal, etc., which can also be determined according to actual situations, and is not particularly limited by the embodiments of the present application.

S204: process the interactive video according to the processing information.

Here, the server can perform corresponding processing on the interactive video according to the above different processing information. For example, taking the discarding information for discarding the interactive video after the interactive video is acquired and sent by the second user terminal as an example, the server can determine a third user terminal receiving the interactive video according to the discarding information, and then send the interactive video to the third user terminal.

In the embodiments of the present application, a server receives an interactive video uploaded by a first user terminal and sends the interactive video to a second user terminal. That is, in the embodiments of the present application, the video is taken as a carrier of interaction between strangers, which can bear diversified user information expressions. Moreover, the server may further receives processing information for the interactive video sent by the second user terminal and/or the first user terminal, and processes the interactive video according to the processing information. That is, based on the video, friendly video interaction between strangers is realized, and social experiences of strangers in social activities are improved.

Figure 3:
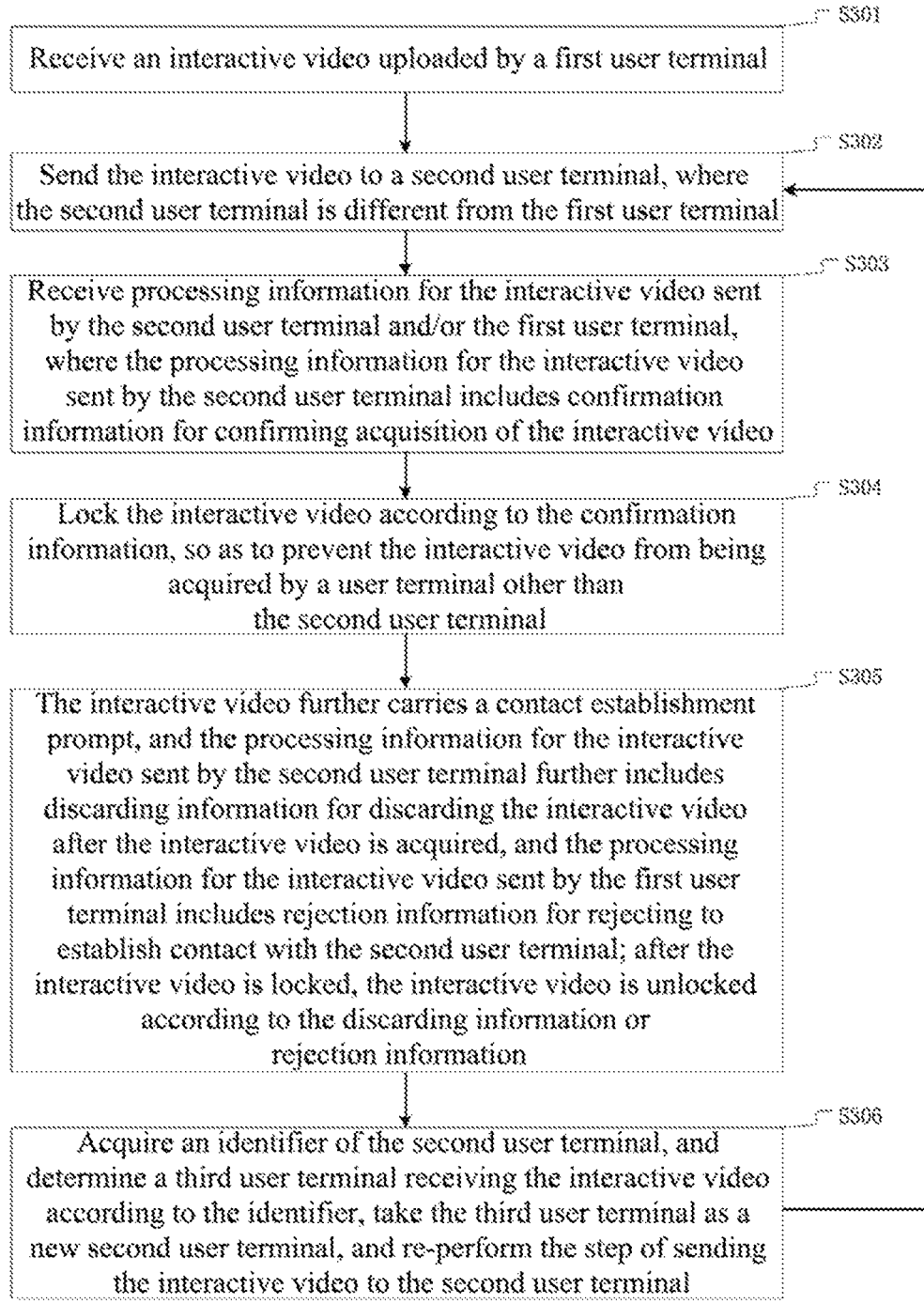
FIG. 3 is a schematic flowchart of another information interaction method provided by an embodiment of the present application.

In addition, the processing information for the interactive video sent by the second user terminal includes confirmation information for confirming acquisition of the interactive video. Furthermore, in the embodiments of the present application, locking of the interactive video is considered when the interactive video is processed according to such processing information. FIG. 3 is a schematic flowchart of another information interaction method proposed by an embodiment of the present application. As shown in FIG. 3, the method includes:

S301: receive an interactive video uploaded by a first user terminal;

S302: send the interactive video to a second user terminal, where the second user terminal is different from the first user terminal.

The implementations of steps S301-S302 are the same as the above steps S201-S202, and will not be repeated here.

S303: receive processing information for the interactive video sent by the second user terminal and/or the first user terminal, where the processing information for the interactive video sent by the second user terminal includes confirmation information for confirming acquisition of the interactive video.

S304: lock the interactive video according to the confirmation information, so as to prevent the interactive video from being acquired by a user terminal other than the second user terminal.

Here, after receiving the confirmation information for confirming acquisition of the interactive video sent by the second user terminal, the server can mark a state of the interactive video as a third state, such as Busy state, that is, it cannot be salvaged by other users, so as to lock the interactive video. The locking ensures that the interactive video will not be salvaged by multiple users at the same time, that is, will not be acquired by a user terminal other than the second user terminal.

S305: the interactive video further carries a contact establishment prompt, and the processing information for the interactive video sent by the second user terminal further includes discarding information for discarding the interactive video after the interactive video is acquired, and the processing information for the interactive video sent by the first user terminal includes rejection information for rejecting to establish contact with the second user terminal. After the interactive video is locked, the interactive video is unlocked according to the discarding information or rejection information.

In the embodiments of the present application, if the server receives the confirmation information for confirming acquisition of the interactive video sent by the second user terminal, it means that some users have acquired the interactive video, and in order to prevent the interactive video from being acquired by other users, the server locks the interactive video (for example, marks the state of the interactive video as Busy state). After locking, if the user who acquired the interactive video chooses to discard the acquired interactive video, the user can send, through the second user terminal, to the server the discarding information for discarding the interactive video after the interactive video is acquired, and after receiving the discarding information, the server releases the original lock (for example, changes Busy state to Ready state).

In addition, the interactive video further carries a contact establishment prompt. After the server receives the confirmation information for confirming acquisition of the interactive video sent by the second user terminal, the server locks the interactive video. The second user terminal can send a contact establishment request to the first user terminal according to the contact establishment prompt. If the first user terminal rejects to establish contact with the second user terminal, the first user terminal may send the rejection information for rejecting to establish contact with the second user terminal to the server, and the server releases the original lock after receiving the rejection information.

Here, in the above two cases, the server releases the original lock in the interactive video, so that other users can acquire the interactive video in the future, in this way, actual application requirements can be met.

S306: acquire an identifier of the second user terminal, determine a third user terminal receiving the interactive video according to the identifier, take the third user terminal as a new second user terminal, and re-perform the step of sending the interactive video to the second user terminal.

Here, in order to prevent the interactive video from being repeatedly salvaged by the same user, the server will acquire the identifier of the second user terminal after releasing the original lock. In this way, when determining the third user terminal receiving the interactive video, the second user terminal can be deleted when the user terminal receiving the interactive video is determined according to the identifier of the second user terminal, that is, the interactive video will not be sent to the second user terminal again. Therefore, the third user terminal receiving the interactive video is determined, and then the third user terminal is taken as a new second user terminal, and the step of sending the interactive video to the second user terminal is re-performed.

In the embodiments of the present application, processing information for an interactive video sent by a second user terminal includes confirmation information for confirming acquisition of the interactive video, and then, the interactive video is locked when the interactive video is processed according to the processing information, thus ensuring that the interactive video will not be salvaged by multiple users at the same time. After the interactive video is locked, if the second user terminal discards the interactive video or the first user terminal rejects to establish contact with the second user terminal, the server releases the original lock, so that subsequent users of other terminals can obtain the interactive video. In addition, in order to prevent the interactive video from being repeatedly salvaged by the same user, when determining the new user terminal corresponding to the interactive video, the server will acquire an identifier of the second user terminal, therefore, according to the identifier of the second user terminal, the second user terminal can be deleted when a new user terminal receiving the interactive video is determined, and the third user terminal receiving the interactive video can be determined, so as to meet actual application requirements. In addition, in the embodiments of the present application, the video is taken as an interactive carrier which can bear diversified user information expressions. Moreover, based on the video, friendly video interaction between strangers is realized, and social experiences of strangers in social activities are improved.

In addition, the interactive video further carries a contact establishment prompt, and the processing information for the interactive video sent by the first user terminal includes consent information for consenting to establish contact with the second user terminal. In the embodiments of the present application, deletion of the interactive video according to the consent information is also considered when the interactive video is processed according to such processing information.

Figure 4:
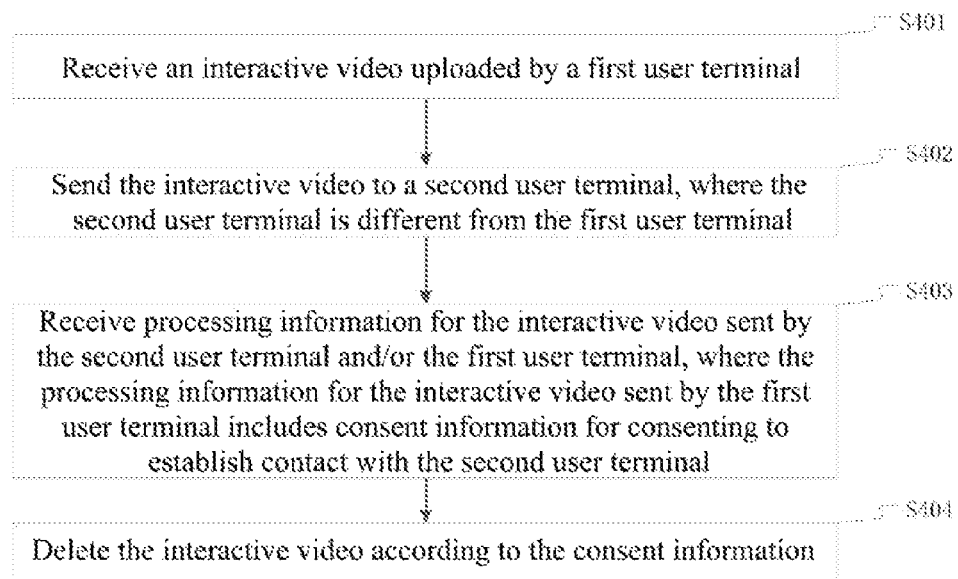
FIG. 4 is a schematic flowchart of yet another information interaction method provided by an embodiment of the present application.

FIG. 4 is a schematic flowchart of another information interaction method proposed by an embodiment of the present application. As shown in FIG. 4, the method includes:

S401: receive an interactive video uploaded by a first user terminal;

S402: send the interactive video to a second user terminal, where the second user terminal is different from the first user terminal.

The implementations of steps S401-S402 are the same as the above steps S201-S202, and will not be repeated here.

S403: receive processing information for the interactive video sent by the second user terminal and/or the first user terminal, where the processing information for the interactive video sent by the first user terminal includes consent information for consenting to establish contact with the second user terminal.

S404: delete the interactive video according to the consent information.

Here the interactive video further carries a contact establishment prompt. After the server sends the interactive video to the second user terminal, the second user terminal can send a contact establishment request to the first user terminal according to the contact establishment prompt. If the first user terminal consents to establish contact with the second user terminal, the first user terminal can send the consent information for consenting to establish contact with the second user terminal to the server, and the server deletes the interactive video and releases a memory.

According to the embodiments of the present application, a user can establish contact with strangers through an interactive video, and notify, after the contact is established, a server to delete all records of the interactive video and release the memory, so that more interactive videos can be acquired for subsequent processing, which is suitable for applications. In addition, in the embodiments of the present application, the video is taken as an interactive carrier, which can bear diversified user information expressions. Moreover, based on the video, friendly video interaction between strangers is realized, and social experiences of strangers in social activities are improved.

In the above embodiments, the information interaction method according to the embodiments of the present application is described in detail from the server side, and the information interaction method provided according to the embodiments of the present application will be described below from the terminal side in conjunction with the following embodiments in detail. It should be understood that some concepts, features, etc. described from the server side correspond to those described from the terminal side, and the repeated descriptions are omitted appropriately for the sake of brevity.

Figure 5:
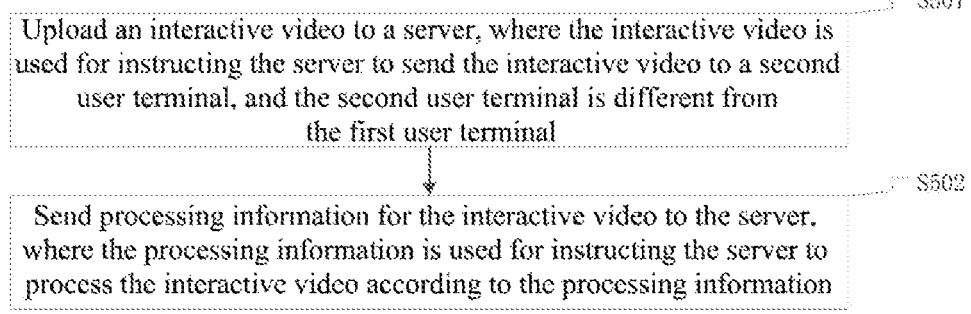
FIG. 5 is a schematic flowchart of yet another information interaction method provided by an embodiment of the present application.

FIG. 5 is a schematic flowchart of another information interaction method provided by an embodiment of the present application, and the executive subject of this embodiment may be the first user terminal in FIG. 1. As shown in FIG. 5, the method may include the following steps:

S501: upload an interactive video to a server, where the interactive video is used for instructing the server to send the interactive video to a second user terminal, and the second user terminal is different from the first user terminal;

S502: send processing information for the interactive video to the server, where the processing information is used for instructing the server to process the interactive video according to the processing information.

In a possible implementation, the interactive video further carries a contact establishment prompt, and the processing information includes consent information for consenting to establish contact with the second user terminal, and the consent information is used for instructing the server to delete the interactive video.

Here the interactive video further carries a contact establishment prompt. After the first user terminal uploads the interactive video to the server, and the server sends the interactive video to the second user terminal, the second user terminal may send a contact establishment request to the first user terminal according to the contact establishment prompt.

If the first user terminal consents to establish contact with the second user terminal, the first user terminal can send the consent information for consenting to establish contact with the second user terminal to the server, and the server will delete the interactive video and release a memory.

According to the embodiments of the present application, a user can establish contact with strangers through an interactive video, and notify, after the contact is established, the server to delete all records of the interactive video and release the memory, so that more interactive videos can be acquired for subsequent processing, which is suitable for applications. In addition, in the embodiments of the present application, the video is taken as an interactive carrier, which can bear diversified user information expressions. Moreover, based on the video, friendly video interaction between strangers is realized, and social experiences of strangers in social activities are improved.

Figure 6:
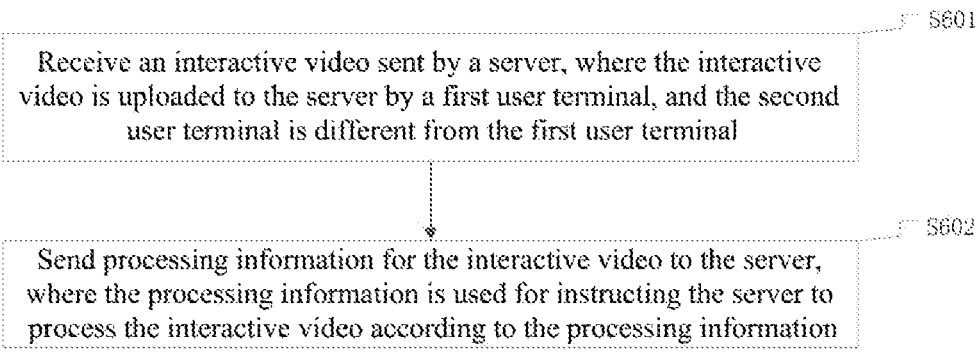
FIG. 6 is a schematic flowchart of yet another information interaction method provided by an embodiment of the present application.

FIG. 6 is a schematic flowchart of another information interaction method provided by an embodiment of the present application, and the executive subject of this embodiment may be the second user terminal in FIG. 1. As shown in FIG. 6, the method may include the following steps:

S601: receive an interactive video sent by a server, where the interactive video is uploaded to the server by a first user terminal, and the second user terminal is different from the first user terminal;

S602: send processing information for the interactive video to the server, where the processing information is used for instructing the server to process the interactive video according to the processing information.

In a possible implementation, the processing information includes confirmation information for confirming acquisition of the interactive video, and the confirmation information is used for instructing the server to lock the interactive video to prevent the interactive video from being acquired by a user terminal other than the second user terminal.

In a possible implementation, the interactive video further carries a contact establishment prompt, and the processing information further includes discarding information for discarding the interactive video after the interactive video is acquired, and the discarding information is used for instructing the server to unlock the interactive video.

In a possible implementation, the interactive video further carries a contact establishment prompt. After receiving the interactive video sent by the server, the second user terminal can send a contact establishment request to the first user terminal according to the contact establishment prompt. If the first user terminal consents to establish contact with the second user terminal, the first user terminal can send consent information for consenting to establish contact with the second user terminal to the server, and the server will delete the interactive video and release a memory.

According to the embodiments of the present application, after receiving an interactive video sent by a server, if the interactive video is acquired, the second user terminal sends confirmation information for confirming acquisition of the interactive video to the server, and the server locks the interactive video, thus ensuring that the interactive video will not be salvaged by multiple users at the same time. After locking the interactive video, if the second user terminal discards the interactive video, the server releases the original lock, so that other users can acquire the interactive video later. The interactive video further carries a contact establishment prompt, and the second user terminal can send a contact establishment request to the first user terminal according to the contact establishment prompt. If the first user terminal consents to establish contact with the second user terminal, the first user terminal can send consent information for consenting to establish contact with the second user terminal to the server, and the server deletes the interactive video and releases the memory. In addition, in the embodiments of the present application, the video is taken as an interactive carrier, which can bear diversified user information expressions. Moreover, based on the video, friendly video interaction between strangers is realized, and social experiences of strangers in social activities are improved.

Figure 7A:
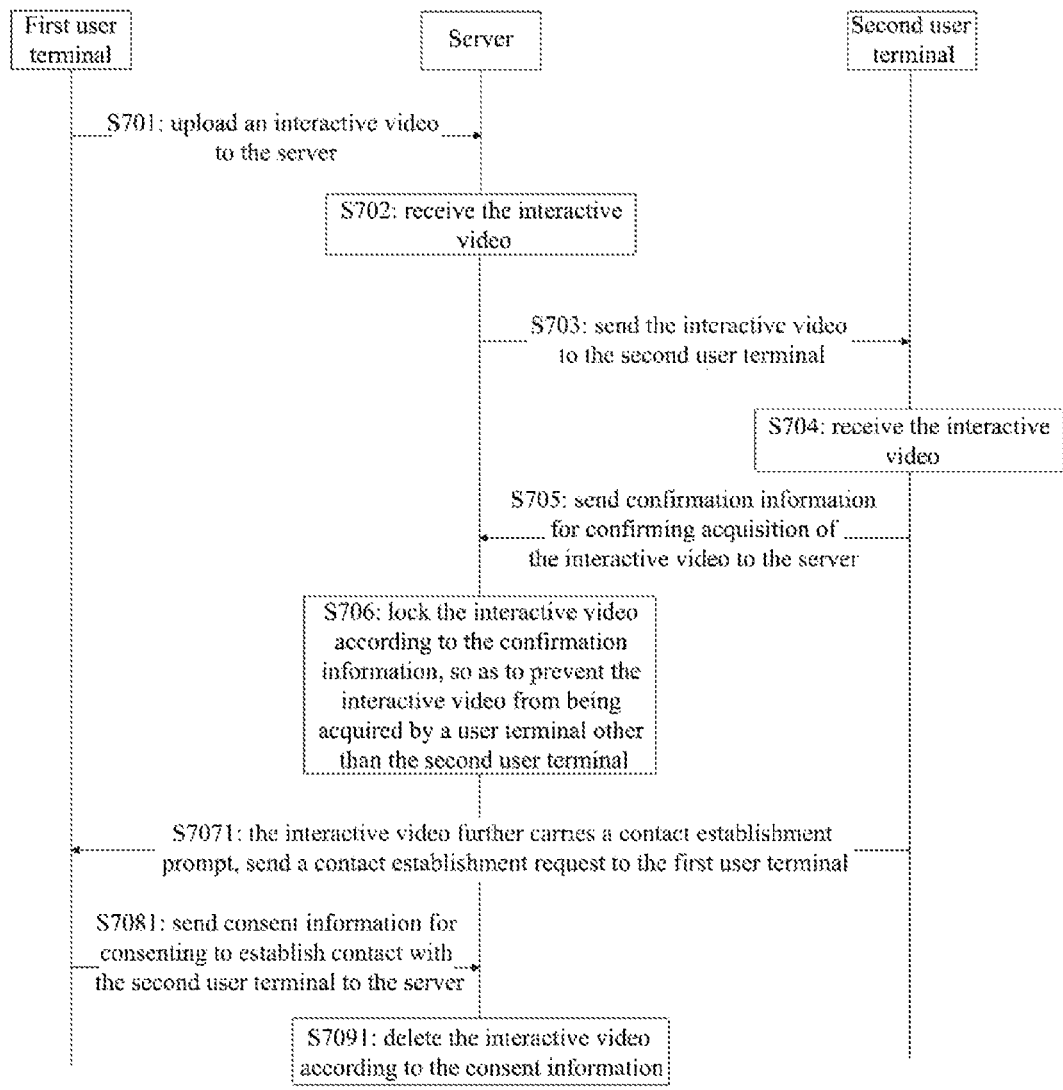
FIG. 7A is a schematic flowchart of yet another information interaction method provided by an embodiment of the present application.
Figure 7B:
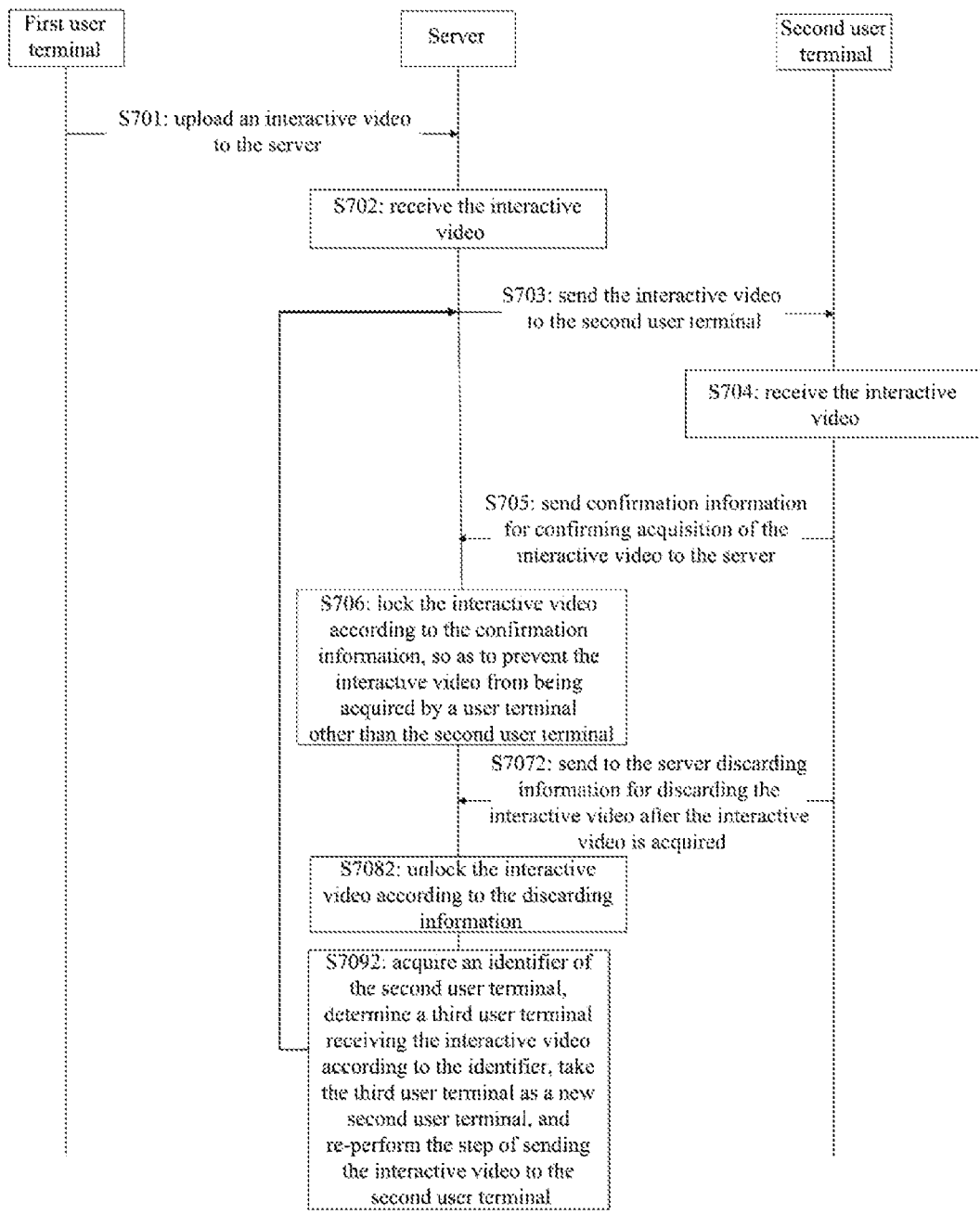
FIG. 7B is a schematic flowchart of yet another information interaction method provided by an embodiment of the present application.

In addition, an embodiment of the present application provides another information interaction method, which is described from the perspective of interaction among a first user terminal, a server and a second user terminal, as shown in FIGS. 7A and 7B. Exemplarily, in FIG. 7A, the method may include:

S701: the first user terminal uploads an interactive video to a server;

S702: the server receives the interactive video;

S703: the server sends the interactive video to the second user terminal, where the second user terminal is different from the first user terminal.

Exemplarily, before the server sends the interactive video to the second user terminal, the method further includes:
determining video features of the interactive video; and
determining, according to the video features, the second user terminal receiving the interactive video.

In an embodiment, before the server determines the video features of the interactive video, the method further includes:
performing compliance detection on the interactive video;
where the determining the video features of the interactive video includes:
if the interactive video passes the compliance detection, determining the video features according to video content of the interactive video.

In some feasible embodiments, the determining the video features of the interactive video includes:
inputting the interactive video into a preset feature extraction model, where the preset feature extraction model is obtained through training of reference videos and video features of the reference videos; and
determining the video features of the interactive video according to an output of the preset feature extraction model.

In addition, before sending the interactive video to the second user terminal, the server may further:
determine a rendering watermark and a video special effect corresponding to the interactive video according to video content of the interactive video; and
perform watermark rendering on the interactive video according to the rendering watermark, and perform video special effect processing on the interactive video according to the video special effect.

S704: the second user terminal receives the interactive video.

S705: the second user terminal sends confirmation information for confirming acquisition of the interactive video to the server after receiving the interactive video.

S706: the server locks the interactive video according to the confirmation information, so as to prevent the interactive video from being acquired by a user terminal other than the second user terminal.

S7071: the interactive video further carries a contact establishment prompt, and after acquiring the interactive video, the second user terminal can send a contact establishment request to the first user terminal if the second user terminal wants to establish contact with the first user terminal.

S7081: after receiving the above request, if the first user terminal consents to establish contact with the second user terminal, the first user terminal sends consent information for consenting to establish contact with the second user terminal to the server.

S7091: the server deletes the interactive video according to the consent information.

Here the interactive video further carries a contact establishment prompt, and the second user terminal can send a contact establishment request to the first user terminal according to the contact establishment prompt. If the first user terminal consents to establish contact with the second user terminal, the first user terminal can send consent information for consenting to establish contact with the second user terminal to the server, and the server deletes the interactive video and releases a memory.

In addition, after the server locks the interactive video according to the confirmation information in step S706, if the second user terminal discards the interactive video, the second user terminal can send to the server discarding information for discarding the interactive video after the interactive video is acquired, and then the server unlocks the interactive video according to the discarding information. For example, in FIG. 7B, the method may include:

S7072: if the second user terminal discards the interactive video after acquiring the interactive video, the second user terminal sends to the server discarding information for discarding the interactive video after the interactive video is acquired;

S7082: the server unlocks the interactive video according to the discarding information;

S7092: the server acquires an identifier of the second user terminal, determines, according to the identifier, a third user terminal receiving the interactive video, takes the third user terminal as a new second user terminal, and re-performs the step of sending the interactive video to the second user terminal.

In addition, after the second user terminal acquires the interactive video, if the second user terminal wants to establish contact with the first user terminal, the second user terminal sends a contact establishment request to the first user terminal. After receiving the request, if the first user terminal rejects to establish contact with the second user terminal, the first user terminal sends rejection information for rejecting to establish contact with the second user terminal to the server, and the server can unlock the interactive video according to the rejection information. Further, the server acquires the identifier of the second user terminal, determines, according to the identifier, the third user terminal receiving the interactive video, takes the third user terminal as a new second user terminal, and re-performs the step of sending the interactive video to the second user terminal.

As can be seen from the above description, in the embodiments of the present application, the video is taken as an interactive carrier, which can bear diversified user information expressions. Moreover, based on the video, friendly video interaction between strangers is realized, and social experiences of strangers in social activities are improved.

In addition, after sending the interactive video to the second user terminal, the server further considers whether it receives confirmation information for confirming acquisition of the interactive video sent by the second user terminal, and if so, the server locks the interactive video to ensure that the interactive video will not be salvaged by multiple users at the same time. After locking the interactive video, if the second user terminal discards the interactive video or if the first user terminal rejects to establish contact with the second user terminal, the server releases the original lock, so that other users can acquire the interactive video in the future. In addition, in order to prevent the interactive video from being repeatedly salvaged by the same user, the server will acquire the identifier of the second user terminal when determining a new user terminal corresponding to the interactive video, so that the second user terminal can be deleted according to the identifier of the second user terminal when the new user terminal receiving the interactive video is determined, and the third user terminal receiving the interactive video can be determined, so as to meet actual application requirements.

Moreover, the user can establish contact with strangers through the above interactive video, and notify, after the contact is established, the server to delete all records of the interactive video and release the memory, so that more interactive videos can be acquired for subsequent processing, which is suitable for applications.

Figure 8:
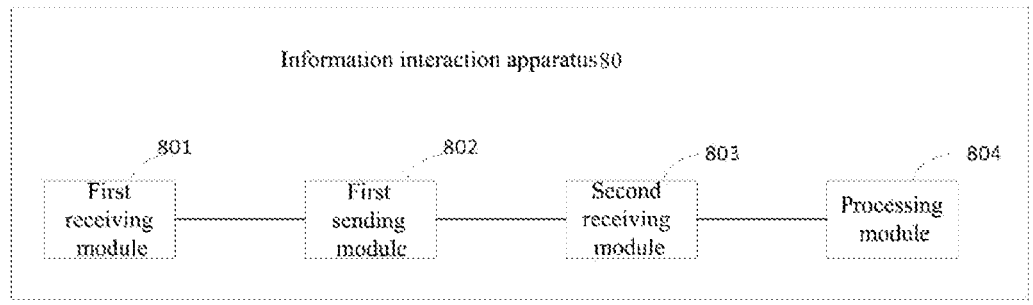
FIG. 8 is a structural schematic diagram of an information interaction apparatus provided by an embodiment of the present application.

FIG. 8 is a structural schematic diagram of an information interaction apparatus provided by an embodiment of the present application corresponding to the information interaction method of the above embodiments. For convenience of description, only parts related to the embodiments of the present application are shown. FIG. 8 is a structural schematic diagram of an information interaction apparatus provided by an embodiment of the present application. The information interaction apparatus 80 includes a first receiving module 801, a first sending module 802, a second receiving module 803 and a processing module 804. The information interaction apparatus here can be the above server per se, or a chip or integrated circuit that realizes the functions of the server. It should be noted here that the division of the first receiving module, the first sending module, the second receiving module and the processing module is only a division of logical functions, which can be integrated or separated physically.

The first receiving module 801 is configured to receive an interactive video uploaded by a first user terminal.

The first sending module 802 is configured to send the interactive video to a second user terminal, where the second user terminal is different from the first user terminal.

The second receiving module 803 is configured to receive processing information for the interactive video sent by the second user terminal and/or the first user terminal.

The processing module 804 is configured to process the interactive video according to the processing information.

In a possible implementation, the first sending module 802 is further configured to:
determine video features of the interactive video; and
determine the second user terminal receiving the interactive video according to the video features.

In a possible implementation, the first sending module 802 is further configured to:
perform compliance detection on the interactive video;
the first sending module 802 is specifically configured to:
if the interactive video passes the compliance detection, determine the video features according to video content of the interactive video.

In a possible implementation, the first sending module 802 is specifically configured to:
input the interactive video into a preset feature extraction model, where the preset feature extraction model is obtained through training of reference videos and video features of the reference videos; and determine the video features of the interactive video according to an output of the preset feature extraction model.

In a possible implementation, the first sending module 802 is further configured to:

determine a rendering watermark and a video special effect corresponding to the interactive video according to video content of the interactive video; and perform watermark rendering on the interactive video according to the rendering watermark, and perform video special effect processing on the interactive video according to the video special effect.

In a possible implementation, the processing information for the interactive video sent by the second user terminal includes confirmation information for confirming acquisition of the interactive video;

the processing module 804 is specifically configured to:

lock the interactive video according to the confirmation information to prevent the interactive video from being acquired by a user terminal other than the second user terminal.

In a possible implementation, the interactive video further carries a contact establishment prompt, and the processing information for the interactive video sent by the second user terminal further includes discarding information for discarding the interactive video after the interactive video is acquired, and the processing information for the interactive video sent by the first user terminal includes rejection information for rejecting to establish contact with the second user terminal;

the processing module 804 is specifically configured to:

unlock the interactive video according to the discarding information or the rejection information.

In a possible implementation, after the processing module 804 unlocks the interactive video, the first sending module 802 is further configured to:

acquire an identifier of the second user terminal, and determine, according to the identifier, a third user terminal receiving the interactive video; and take the third user terminal as a new second user terminal, and re-perform the step of sending the interactive video to the second user terminal.

In a possible implementation, the interactive video further carries a contact establishment prompt, and the processing information for the interactive video sent by the first user terminal includes consent information for consenting to establish contact with the second user terminal;

the processing module 804 is specifically configured to:

delete the interactive video according to the consent information.

The apparatus provided by the embodiments of the present application can be used to implement the technical solutions of the method embodiments described in FIG. 2, FIG. 3 and FIG. 4. The implementation principles and technical effects thereof are similar, which will not be repeated here in the embodiments of the present application for the sake of brevity.

Figure 9:
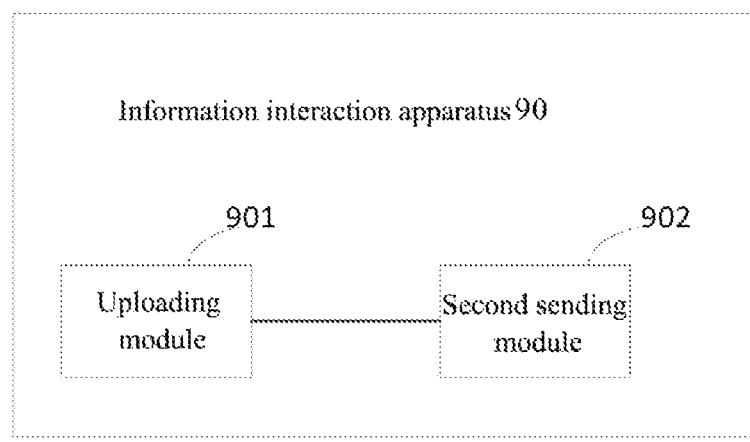
FIG. 9 is a structural schematic diagram of another information interaction apparatus provided by an embodiment of the present application.

FIG. 9 is a structural schematic diagram of another information interaction apparatus provided by an embodiment of the present application. The information interaction apparatus 90 includes an uploading module 901 and a second sending module 902. The information interaction apparatus here may be the first user terminal per se, or a chip or integrated circuit that realizes the functions of the first user terminal. It should be noted here that the division of the uploading module and the second sending module is only a division of logical functions, which can be integrated or separated physically.

The uploading module 901 is configured to upload an interactive video to a server, and the interactive video is used for instructing the server to send the interactive video to a second user terminal, and the second user terminal is different from the first user terminal.

The second sending module 902 is configured to send processing information for the interactive video to the server, where the processing information is used for instructing the server to process the interactive video according to the processing information.

In a possible implementation, the interactive video further carries a contact establishment prompt, and the processing information includes consent information for consenting to establish contact with the second user terminal, and the consent information is used for instructing the server to delete the interactive video.

The apparatus provided by the embodiments of the present application can be used to implement the technical solutions of the method embodiment shown in FIG. 5. The implementation principles and technical effects thereof are similar, which will not be repeated here in the embodiments of the present application for the sake of brevity.

Figure 10:
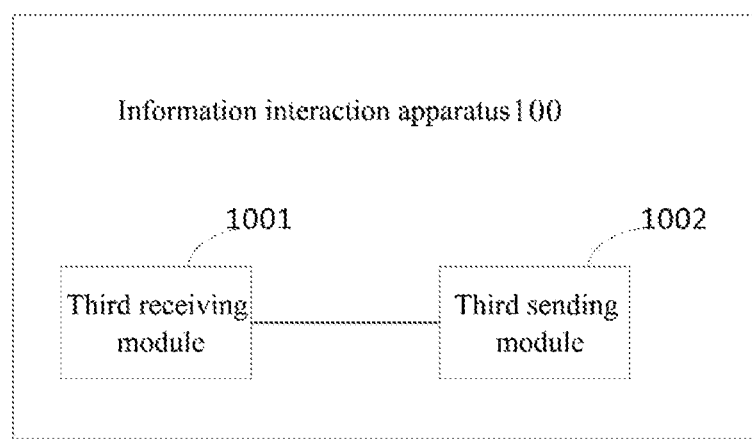
FIG. 10 is a structural schematic diagram of yet another information interaction apparatus provided by an embodiment of the present application.

FIG. 10 is a structural schematic diagram of another information interaction apparatus provided by an embodiment of the present application. The information interaction apparatus 100 includes a third receiving module 1001 and a third sending module 1002. The information interaction apparatus here may be the second user terminal per se, or a chip or integrated circuit that realizes the functions of the second user terminal. It should be noted here that the division of the third receiving module and the third sending module is only a division of logical functions, which can be integrated or separated physically.

The third receiving module 1001 is configured to receive an interactive video sent by a server, where the interactive video is uploaded to the server by a first user terminal, and the second user terminal is different from the first user terminal.

The third sending module 1002 is configured to send processing information for the interactive video to the server, where the processing information is used for instructing the server to process the interactive video according to the processing information.

In a possible implementation, the processing information includes confirmation information for confirming acquisition of the interactive video, and the confirmation information is used for instructing the server to lock the interactive video to prevent the interactive video from being acquired by a user terminal other than the second user terminal.

In a possible implementation, the interactive video further carries a contact establishment prompt, and the processing information further includes discarding information for discarding the interactive video after the interactive video is acquired, and the discarding information is used for instructing the server to unlock the interactive video.

The apparatus provided by the embodiments of the present application can be used to implement the technical solutions of the method embodiment shown in FIG. 6. The implementation principles and technical effects thereof are similar, which will not be repeated here in the embodiments of the present application for the sake of brevity.

Figure 11:
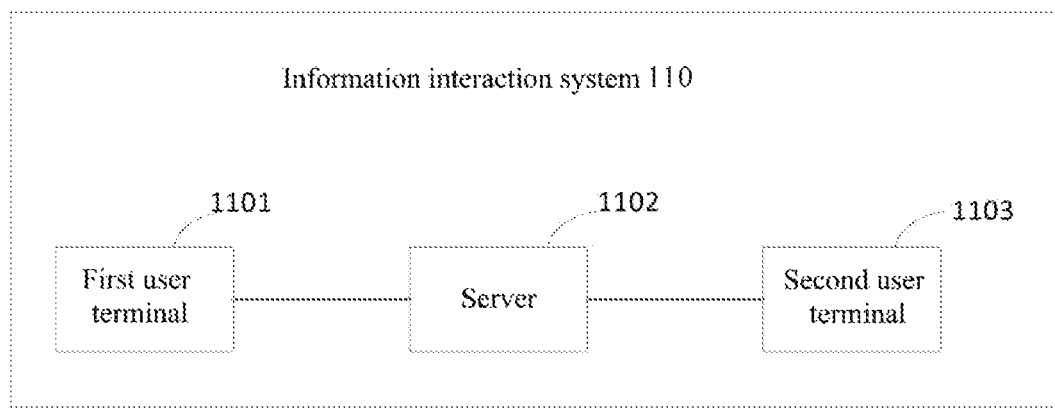
FIG. 11 is a structural schematic diagram of an information interaction system provided by an embodiment of the present application.

FIG. 11 is a structural schematic diagram of an information interaction system provided by an embodiment of the present application, and the information interaction system 110 includes:

a first user terminal 1101, configured to upload an interactive video to a server 1102, and send processing information for the interactive video to the server 1102;

the server 1102, configured to receive the interactive video, send the interactive video to a second user terminal 1103, receive the processing information for the interactive video sent by the second user terminal 1103 and/or processing information for the interactive video sent by the first user terminal 1101, and process the interactive video according to the processing information, where the second user terminal 1103 is different from the first user terminal 1101;

the second user terminal 1103, configured to receive the interactive video and send the processing information for the interactive video to the server 1102.

In the embodiments of the present application, the video is taken as an interactive carrier, which can bear diversified user information expressions. Moreover, based on the video, friendly video interaction between strangers is realized, and social experiences of strangers in social activities are improved.

Figure 12A:
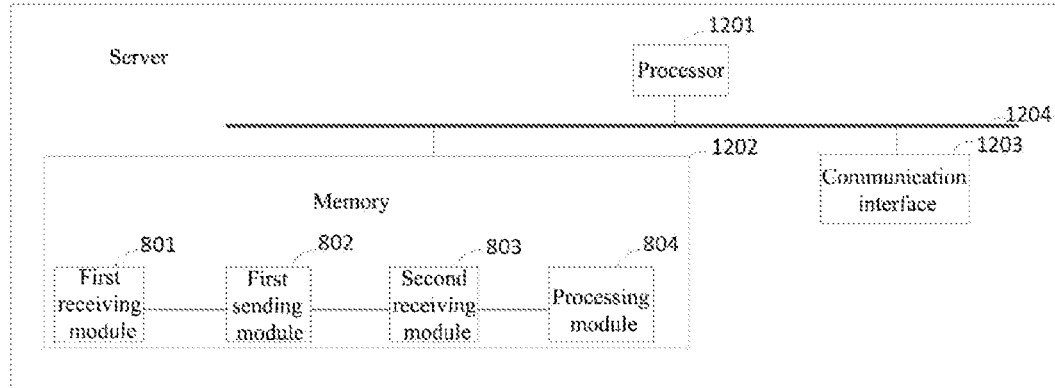
FIG. 12A is a schematic diagram of basic hardware architecture of a server provided by the present application.
Figure 12B:
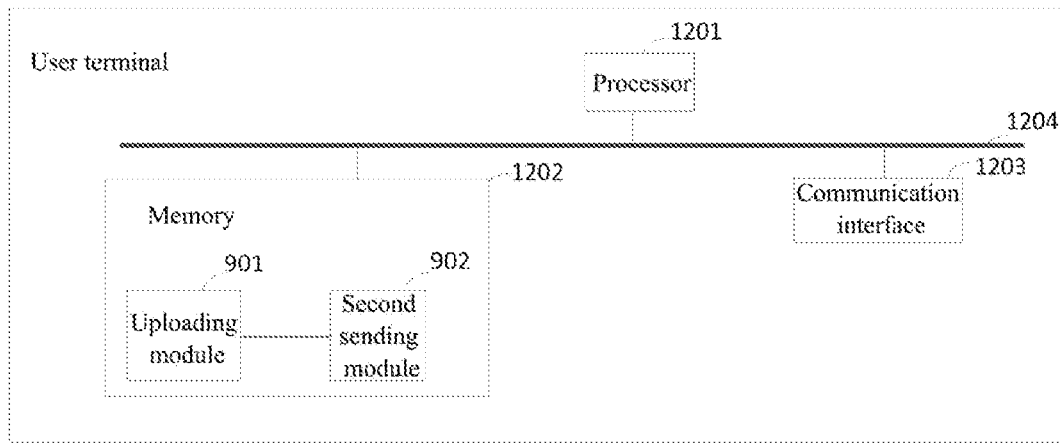
FIG. 12B is a schematic diagram of basic hardware architecture of a user terminal provided by the present application.
Figure 12C:
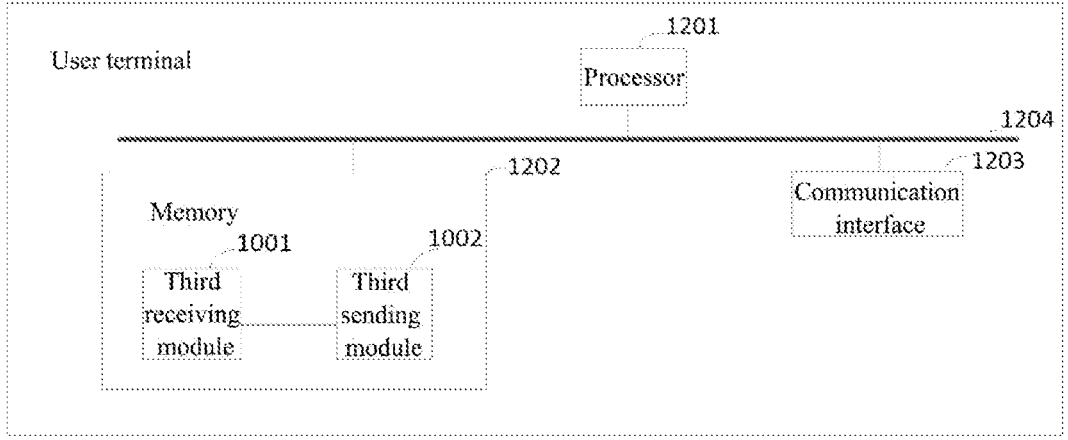
FIG. 12C is a schematic diagram of basic hardware architecture of another user terminal provided by the present application.

In an embodiment, FIGS. 12A, 12B and 12C schematically provide possible basic hardware architecture of the server, one user terminal and another user terminal as described in the present application.

Referring to FIGS. 12A, 12B and 12C, a server, one user terminal and another user terminal 1200 include at least one processor 1201 and a communication interface 1203. In an embodiment, a memory 1202 and a bus 1204 may also be included.

Among the server, one user terminal and another user terminal 1200, the number of processors 1201 can be one or more, and only one of the processors 1201 is shown in FIGS. 12A, 12B and 12C. In an embodiment, the processor 1201 may be a central processing unit (CPU), a graphics processing unit (GPU) or a digital signal processor (DSP). If the server, one user terminal and another user terminal 1200 have multiple processors 1201, the types of the multiple processors 1201 may be different or the same. In an embodiment, the multiple processors 1201 of the server, one user terminal and another user terminal 1200 can also be integrated as multi-core processors.

The memory 1202 stores computer instructions and data; the memory 1202 can store computer instructions and data required to implement the above information interaction method provided in the present application. For example, the memory 1202 stores instructions for implementing the steps of the above information interaction method. The memory 1202 can be any one or any combination of the following storage mediums: a non-volatile memory (such as a read only memory (ROM), a solid state disk (SSD), a hard disk (HDD), and an optical disk), a volatile memory.

The communication interface 1203 can provide information input/output for the at least one processor. It can also include any one or any combination of the following devices: a network interface (such as an Ethernet interface), a wireless network card and other devices with network access functions.

In an embodiment, the communication interface 1203 can also be used for data communication between the server, one user terminal and another user terminal 1200 and other computing devices or terminals.

Further, alternatively, the bus 1204 is represented by a thick line in FIGS. 12A, 12B and 12C. The bus 1204 can connect the processor 1201 with the memory 1202 and the communication interface 1203. In this way, the processor 1201 can access the memory 1202 through the bus 1204, and can also use the communication interface 1203 to perform data interaction with other computing devices or terminals.

In the present application, the server, one user terminal and another user terminal 1200 executes computer instructions in the memory 1202, so that the server, one user terminal and another user terminal 1200 realizes the above information interaction method provided in the present application, or the server, one user terminal and another user terminal 1200 deploy the above information interaction apparatus.

From the perspective of logical function division, for example, as shown in FIG. 12A, the memory 1202 may include the first receiving module 801, the first sending module 802, the second receiving module 803 and the processing module 804. The inclusion here only refers to that the functions of the first receiving module, the first sending module, the second receiving module and the processing module can be realized respectively when the instructions stored in the memory are executed, rather than limitations on the physical structure.

For example, as shown in FIG. 12B, the memory 1202 may include the uploading module 901 and the second sending module 902. The inclusion here only refers to that the functions of the uploading module and the second sending module can be realized respectively when the instructions stored in the memory are executed, rather than limitations on the physical structure.

For example, as shown in FIG. 12C, the memory 1202 may include the third receiving module 1001 and the third sending module 1002. The inclusion here only refers to that the functions of the third receiving module and the third sending module can be realized respectively when the instructions stored in the memory are executed, rather than limitations on the physical structure.

In addition, the above information interaction apparatus can be implemented as a hardware module, or as a circuit unit through hardware, in addition to being implemented by software like the above FIGS. 12A, 12B and 12C.

The present application provides a computer-readable storage medium, and the computer program product includes computer instructions that instruct a computing device to execute the information interaction method provided in the present application.

The present application provides a computer program product, including a computer program, when the computer program is executed by a processor, the information interaction method provided in the present application is implemented.

The present application also provides a computer program, when the computer program is executed by a processor, the information interaction method provided by the present application is implemented.

The present application provides a chip which includes at least one processor and a communication interface, where the communication interface provides information input and/or output for the at least one processor. Further, the chip may also include at least one memory for storing computer instructions. The at least one processor is used for calling and running the computer instructions to execute the information interaction method provided by the present application.

In several embodiments provided in the present application, it should be understood that the disclosed apparatus and method can be implemented in other ways. For example, the above-described apparatus embodiment is only schematic, for example, the division of the units is only a logical function division, and there may be other ways of division in actual implementations, for example, multiple units or components may be combined or integrated into another system, or some features may be ignored or not executed. On the other hand, the shown or discussed mutual coupling or direct coupling or communication connection may be indirect coupling or communication connection through some interfaces, apparatuses or units, which may be in electrical, mechanical or other forms.

The units described as separate components may or may not be physically separated, and the components displayed as units may or may not be physical units, that is, they may be located in one place or distributed over multiple network units. Some or all of the units can be selected according to the actual needs to achieve the purpose of the solutions in the embodiments.

In addition, each functional unit in each embodiment of the present application may be integrated into one processing unit, or each unit may exist physically alone, or two or more units may be integrated into one unit. The above integrated units can be realized in the form of hardware or hardware plus software functional units.

What is claimed is:

1. An information interaction method performed by a server, comprising:
   receiving an interactive video uploaded by a first user terminal;
   sending the interactive video to a second user terminal, wherein the second user terminal is different from the first user terminal;
   receiving processing information for the interactive video sent by the second user terminal or sent by the second user terminal and the first user terminal, wherein the processing information for the interactive video sent by the second user terminal comprises confirmation information for confirming acquisition of the interactive video; and
   processing the interactive video according to the processing information;
   wherein the processing the interactive video according to the processing information comprises:
   locking the interactive video upon receiving the confirmation information sent by the second user terminal, so as to prevent the interactive video from being acquired by a user terminal other than the second user terminal.

2. The method according to claim 1, wherein before sending the interactive video to the second user terminal, the method further comprises:
   determining video features of the interactive video; and
   determining, according to the video features, the second user terminal receiving the interactive video.

3. The method according to claim 2, wherein before determining the video features of the interactive video, the method further comprises:
   performing compliance detection on the interactive video;
   wherein the determining the video features of the interactive video comprises:
   if the interactive video passes the compliance detection, determining the video features according to video content of the interactive video.

4. The method according to claim 2, wherein the determining the video features of the interactive video comprises:
   inputting the interactive video into a preset feature extraction model, wherein the preset feature extraction model is obtained through training of reference videos and video features of the reference videos; and
   determining the video features of the interactive video according to an output of the preset feature extraction model.

5. The method according to claim 1, wherein before sending the interactive video to the second user terminal, the method further comprises:
   determining a rendering watermark and a video special effect corresponding to the interactive video according to video content of the interactive video; and
   performing watermark rendering on the interactive video according to the rendering watermark, and performing video special effect processing on the interactive video according to the video special effect.

6. The method according to claim 1, wherein the interactive video further carries a contact establishment prompt, and the processing information for the interactive video sent by the second user terminal further comprises discarding information for discarding the interactive video after the interactive video is acquired, and the processing information for the interactive video sent by the first user terminal comprises rejection information for rejecting to establish contact with the second user terminal;
   wherein the processing the interactive video according to the processing information further comprises:
   unlocking the interactive video according to the discarding information or the rejection information.

7. The method according to claim 6, wherein after unlocking the interactive video, the method further comprises:
   acquiring an identifier of the second user terminal, and determining, according to the identifier, a third user terminal receiving the interactive video; and
   taking the third user terminal as a new second user terminal, and re-performing the step of sending the interactive video to the second user terminal.

8. The method according to claim 1, wherein the interactive video further carries a contact establishment prompt, and the processing information for the interactive video sent by the first user terminal comprises consent information for consenting to establish contact with the second user terminal;
   wherein the processing the interactive video according to the processing information further comprises:
   deleting the interactive video according to the consent information.

9. The method according to claim 1, wherein the interactive video carries a validity period;
   wherein the sending the interactive video to the second user terminal comprises:
   judging whether the interactive video is within the validity period;
   if the interactive video is within the validity period, sending the interactive video to the second user terminal.

10. An information interaction method performed by a first user terminal, comprising:
    uploading an interactive video to a server, wherein the interactive video is used for instructing the server to send the interactive video to a second user terminal, and the second user terminal is different from the first user terminal; and
    sending processing information for the interactive video to the server, wherein the processing information is used for instructing the server to process the interactive video according to the processing information;
    wherein the interactive video is locked by the server after the server receives confirmation information from the second user terminal to prevent the interactive video from being acquired by a user terminal other than the second user terminal, and the confirmation information is used for confirming acquisition of the interactive video by the second user terminal.

11. The method according to claim 10, wherein, the interactive video further carries a contact establishment prompt, and the processing information comprises consent information for consenting to establish contact with the second user terminal, and the consent information is used for instructing the server to delete the interactive video.

12. The method according to claim 10, wherein the interactive video carries a validity period, and the interactive video is used for instructing the server to send the interactive video to the second user terminal after judging that the interactive video is within the validity period according to the validity period by the server.

13. An information interaction method performed by a second user terminal, comprising:
receiving an interactive video sent by a server, wherein the interactive video is uploaded to the server by a first user terminal, and the second user terminal is different from the first user terminal; and
sending processing information for the interactive video to the server, wherein the processing information is used for instructing the server to process the interactive video according to the processing information;
wherein the processing information comprises confirmation information for confirming acquisition of the interactive video, and the confirmation information is used for instructing the server to lock the interactive video to prevent the interactive video from being acquired by a user terminal other than the second user terminal.

14. The method according to claim 13, wherein the interactive video further carries a contact establishment prompt, and the processing information further comprises discarding information for discarding the interactive video after the interactive video is acquired, and the discarding information is used for instructing the server to unlock the interactive video.

15. The method according to claim 13, wherein the interactive video carries a validity period, and the interactive video is sent by the server after judging that the interactive video is within the validity period according to the validity period.

16. A server, wherein comprising:
a processor;
a memory; and
a computer program;
wherein the computer program is stored in the memory and configured to be executed by the processor, and the computer program comprises instructions for executing the method according to claim 1.

17. The server according to claim 16, wherein the interactive video further carries a contact establishment prompt, and the processing information for the interactive video sent by the second user terminal further comprises discarding information for discarding the interactive video after the interactive video is acquired, and the processing information for the interactive video sent by the first user terminal comprises rejection information for rejecting to establish contact with the second user terminal;
wherein the processing the interactive video according to the processing information further comprises:
unlocking the interactive video according to the discarding information or the rejection information.

18. A user terminal, wherein comprising:
a processor;
a memory; and
a computer program;
wherein the computer program is stored in the memory and configured to be executed by the processor, and the computer program comprises instructions for executing the method according to claim 10.

19. A user terminal, wherein comprising:
a processor;
a memory; and
a computer program;
wherein the computer program is stored in the memory and configured to be executed by the processor, and the computer program comprises instructions for executing the method according to claim 13.

20. A non-transitory computer-readable storage medium, wherein the computer-readable storage medium stores a computer program that causes a processor to execute the method according to claim 1.

* * * * *